(12) United States Patent
Nagasaka et al.

(10) Patent No.: US 10,178,586 B2
(45) Date of Patent: Jan. 8, 2019

(54) USER TERMINAL AND BASE STATION

(71) Applicant: KYOCERA CORPORATION, Kyoto (JP)

(72) Inventors: Yushi Nagasaka, Yokohama (JP); Kugo Morita, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 15/837,729

(22) Filed: Dec. 11, 2017

(65) Prior Publication Data

US 2018/0103397 A1    Apr. 12, 2018

Related U.S. Application Data

(63) Continuation of application No. 14/906,401, filed as application No. PCT/JP2014/069252 on Jul. 18, 2014, now Pat. No. 9,843,970.

(30) Foreign Application Priority Data

Jul. 29, 2013  (JP) ................................ 2013-156433

(51) Int. Cl.
*H04W 36/00* (2009.01)
*H04W 56/00* (2009.01)
(Continued)

(52) U.S. Cl.
CPC ....... *H04W 36/0033* (2013.01); *H04L 5/0035* (2013.01); *H04W 56/0005* (2013.01);
(Continued)

(58) Field of Classification Search
None
See application file for complete search history.

(56) References Cited

U.S. PATENT DOCUMENTS 9,386,489 B2 * 7/2016 Seo ........................ H04W 36/08
2011/0222498 A1 * 9/2011 Chun .................... H04L 1/1877
370/329
(Continued)

FOREIGN PATENT DOCUMENTS

| JP | 2011-040822 A | 2/2011 |
| JP | 2013-520096 A | 5/2013 |
| WO | 2010/150463 A1 | 12/2010 |

OTHER PUBLICATIONS

International Search Report and Written Opinion—PCT/JP2014/069252 dated Oct. 14, 2014.
(Continued)

*Primary Examiner* — Hong S Cho
(74) *Attorney, Agent, or Firm* — Studebaker & Brackett PC

(57) ABSTRACT

A system, user terminal, and processor determine whether to omit transmission of a random access preamble signal in a handover procedure from the first cell controlled by a first base station to a second cell controlled by a second base station when the user terminal transmits a notification indicating that a connection with the second cell is completed. The second base station notifies the user terminal of information via the first base station in response to admitting a handover request, the information indicating first information for adjusting a transmission timing of the notification and second information on a radio resource for transmitting the notification to the second base station. The user terminal determines that it omits transmission of the random access preamble signal on a basis of the first information, and transmits notification to the second base station by use of the second information in response to the determination.

3 Claims, 10 Drawing Sheets

(51) Int. Cl.
*H04L 5/00* (2006.01)
*H04W 72/04* (2009.01)
*H04W 36/08* (2009.01)
*H04W 74/08* (2009.01)

(52) U.S. Cl.
CPC ...... *H04W 72/042* (2013.01); *H04W 36/0077* (2013.01); *H04W 36/08* (2013.01); *H04W 74/0833* (2013.01)

(56) References Cited

U.S. PATENT DOCUMENTS

| | | |
|---|---|---|
| 2012/0100885 A1 | 4/2012 | Shimonabe et al. |
| 2012/0170532 A1 | 7/2012 | Kato et al. |
| 2012/0243510 A1* | 9/2012 | Takano ............... H04W 74/004 370/331 |
| 2012/0257510 A1* | 10/2012 | Jeong ................... H04L 5/0098 370/242 |
| 2013/0188473 A1* | 7/2013 | Dinan ............... H04W 56/0005 370/216 |
| 2016/0323790 A1 | 11/2016 | Wang et al. |

OTHER PUBLICATIONS

3rd Generation Partnership Project; Technical Specification Group Radio Access Network; Coordinated multi-point operation for LTE physical layer aspects (Release 11), 3GPP TR 36.819 V11.1.0 (Dec. 2011), pp. 1-69.
JP Office Action dated Dec. 20, 2016 from corresponding JP Appl No. 2013-156433, with concise statement of relevance, 6 pp.

* cited by examiner

FIG. 8
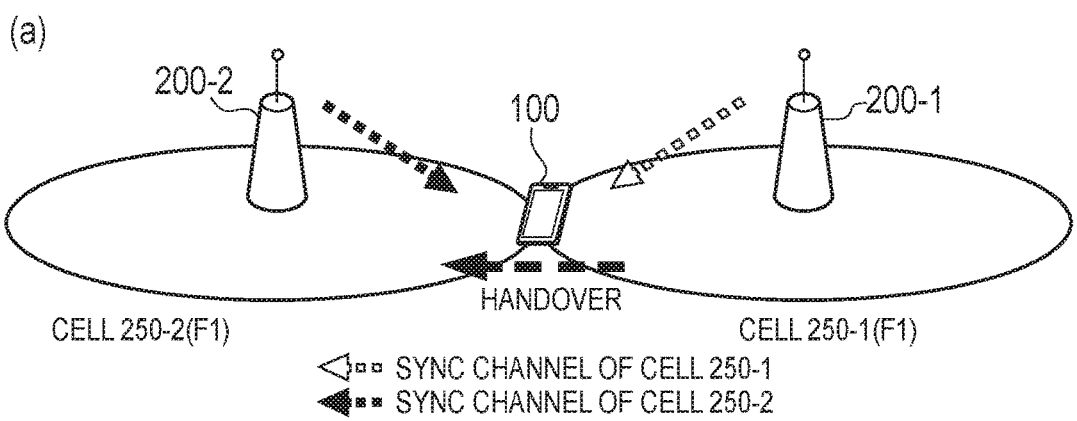
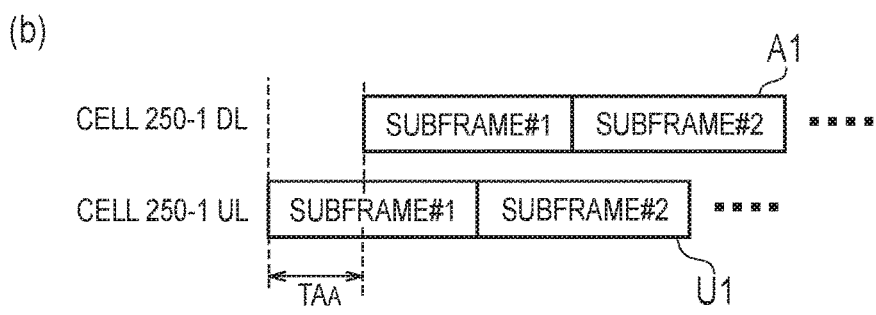
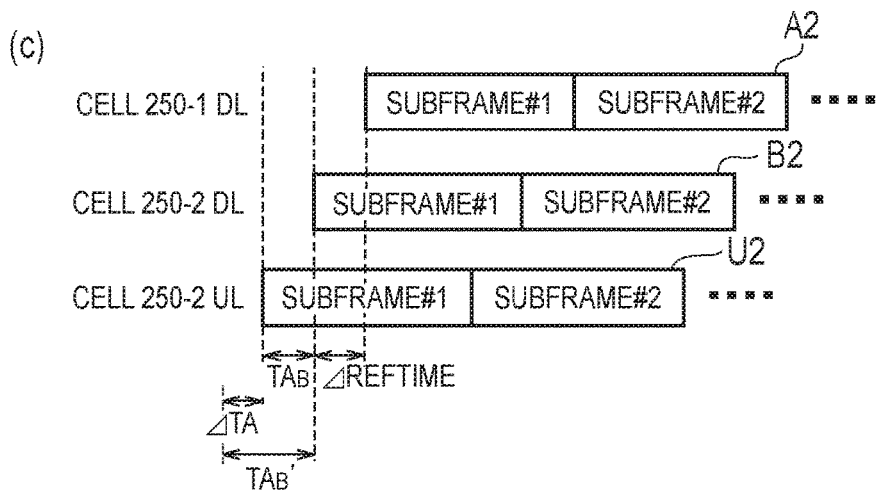

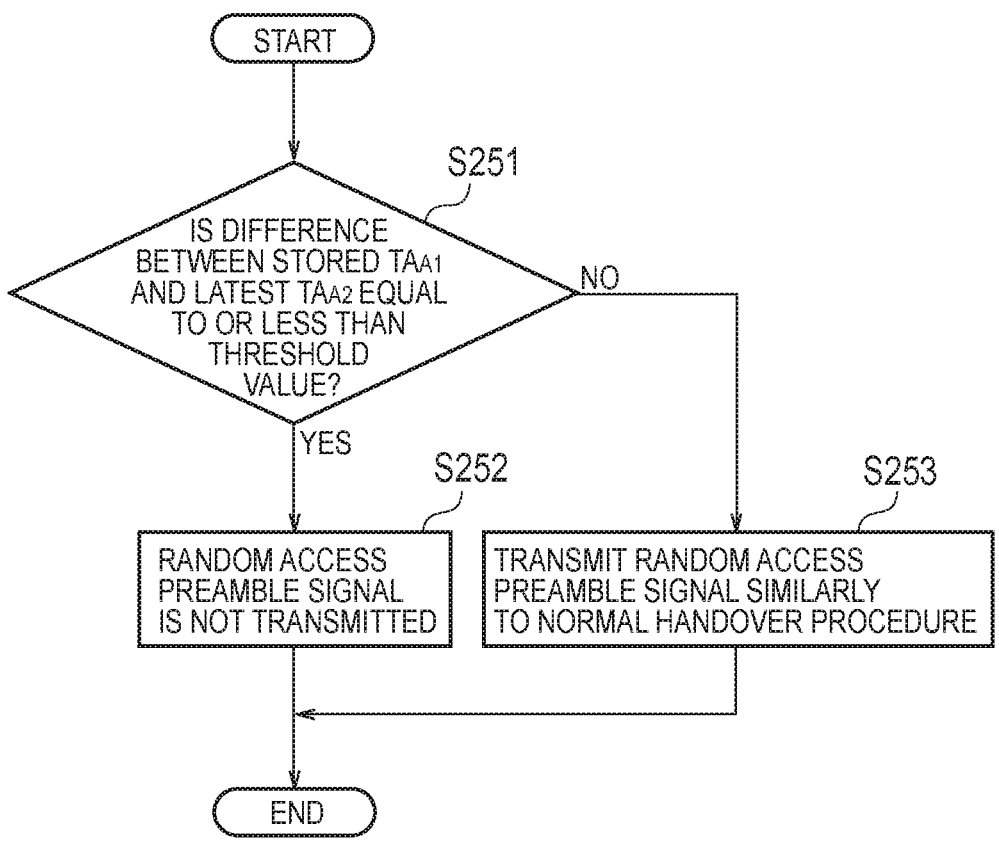

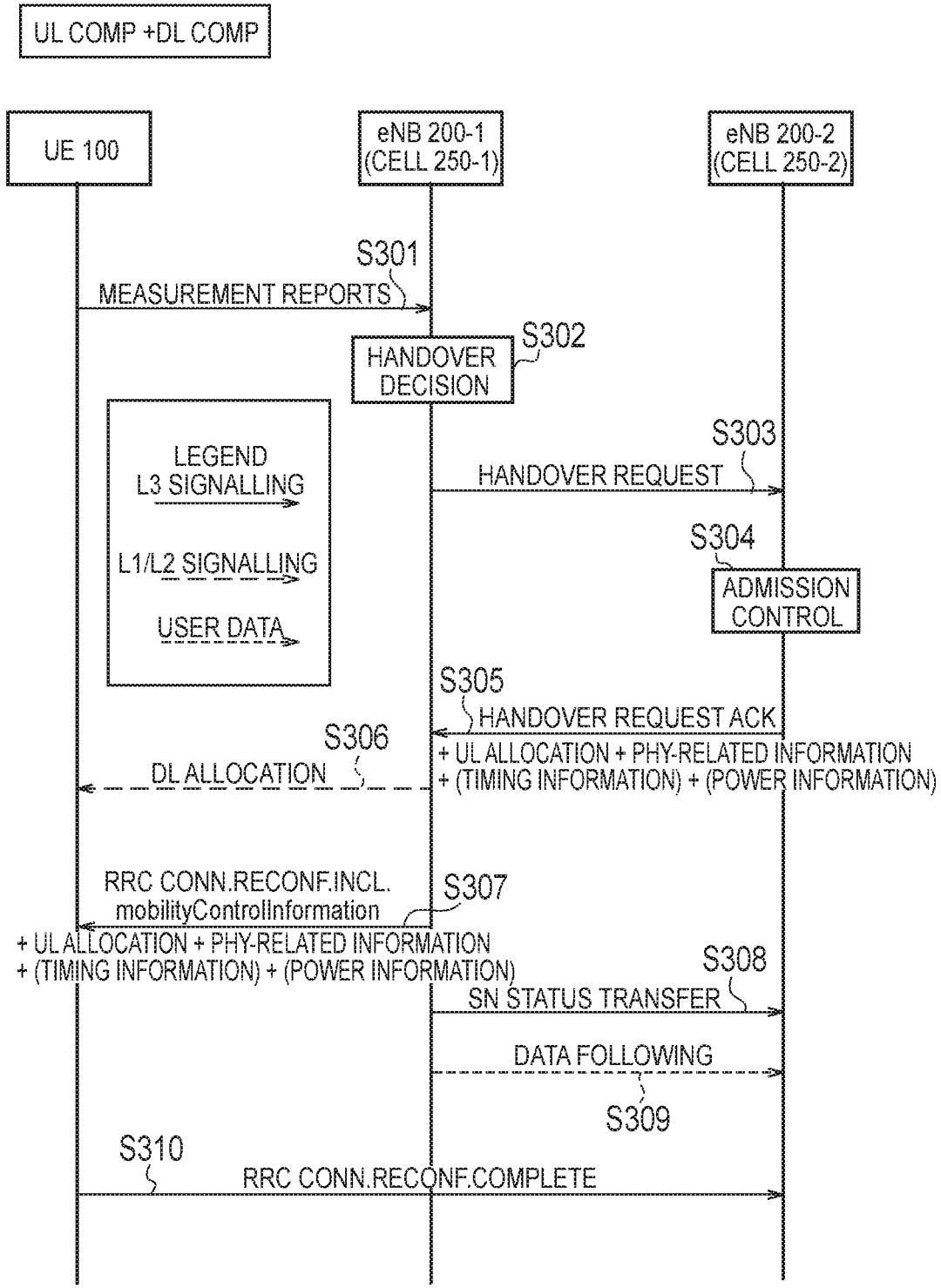

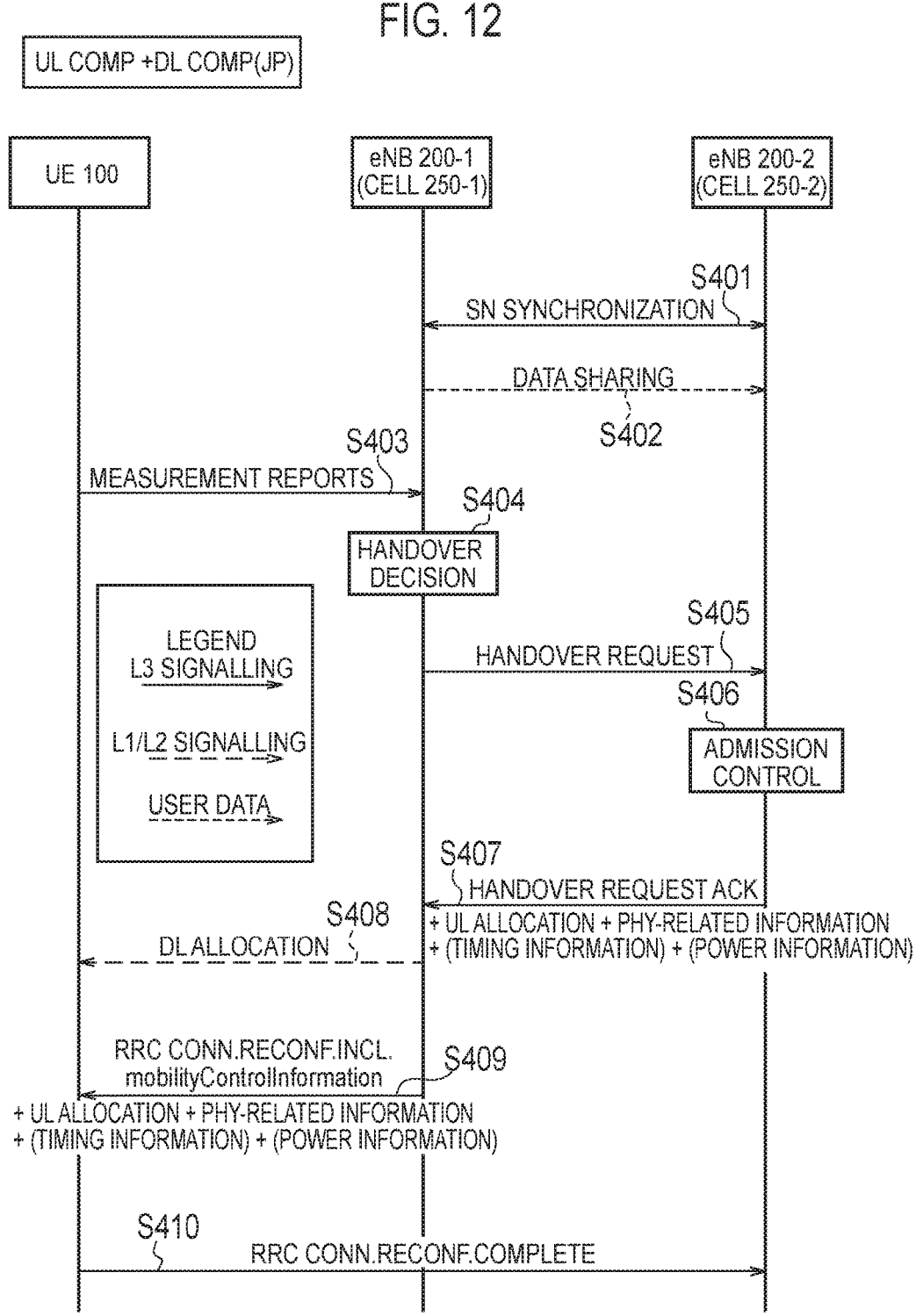

USER TERMINAL AND BASE STATION

CROSS-REFERENCE TO RELATED APPLICATIONS

This application is a Continuation of U.S. patent application Ser. No. 14/906,401 filed Jan. 20, 2016, which is the U.S. National Phase Application of International Application No. PCT/JP2014/069252 filed Jul. 18, 2014, which claims benefit of Japanese Patent Application No. 2013-156433 filed Jul. 29, 2013, the entire contents of which are incorporated herein by reference.

TECHNICAL FIELD

The present disclosure relates to a user terminal and a base station which are used for a mobile communication system that supports CoMP.

BACKGROUND

In 3GPP (3rd Generation Partnership Project) that is a project aiming to standardize a mobile communication system, the standardization of CoMP (Coordinated Multi-Point) is in progress (see Non Patent Document 1).

The CoMP is a communication mode in which an antenna group arranged in the same place is positioned as one "point" and a plurality of points cooperate with one another to perform communication with a user terminal. A point group that performs communication with the user terminal by using one time-frequency resource is called a CoMP cooperating set.

Incidentally, when a handover procedure from a source cell to a target cell is performed, the user terminal transmits a random access preamble signal to the target cell. A target base station that manages the target cell generates timing information for adjusting a timing at which the user terminal transmits an uplink signal on the basis of a reception timing of the random access preamble signal. Then, a target cell base station transmits, to the user terminal, a random access response including the generated timing information. The user terminal transmits, to the target cell, a connection complete notification indicating that a connection with the target cell is completed on the basis of the notified timing information.

PRIOR ART DOCUMENT

Non-Patent Document

Non Patent Document 1: 3GPP technical report "TR36.819 V11.1.0" December 2011

SUMMARY OF THE DISCLOSURE

However, for example, when an uplink signal is transmitted by using a radio resource around a radio resource that is used for transmitting the random access preamble signal, interference may occur because the user terminal transmits the random access preamble signal.

Therefore, the present disclosure provides a user terminal capable of preventing occurrence of interference based on transmission of a random access preamble signal by a user terminal, and a base station.

A communication system according to an embodiment comprises a first base station configured to control a first cell, a second base station configured to control a second cell, and a user terminal configured to determine whether or not to omit a transmission of a random access preamble signal in a handover procedure from the first cell to the second cell when the user terminal transmits a notification indicating that a connection with the second cell is completed. The first base station transmits, to the second base station, a handover request of the user terminal in response to a decision of a handover to the second cell, and the second base station notifies the user terminal of information via the first base station in response to admitting the handover request, where the information indicates first information for adjusting a transmission timing of the notification and second information on a radio resource for transmitting the notification to the second base station. The user terminal determines that the user terminal omits the transmission of the random access preamble signal, on a basis of the first information, and the user terminal transmits the notification to the second base station by use of the second information in response to the determination.

A user terminal according to an embodiment comprises a processor configured to perform a process of determining whether or not to omit a transmission of a random access preamble signal in a handover procedure from a first cell controlled by a first base station to a second cell controlled by a second base station when the user terminal transmits a notification indicating that a connection with the second cell is completed, and memory communicatively coupled to the processor. The processor performs processes of receiving, from the second base station, information via the first base station, where the information indicates first information for adjusting a transmission timing of the notification and second information on a radio resource for transmitting the notification to the second base station, connecting with the second cell, determining that the user terminal omits the transmission of the random access preamble signal, on a basis of the first information, and transmitting the notification to the second base station by use of the second information in response to the determination.

According to an embodiment, a processor for controlling a user terminal is communicatively coupled to memory and configured to perform a process of determining whether or not to omit a transmission of a random access preamble signal in a handover procedure from a first cell controlled by a first base station to a second cell controlled by a second base station when the user terminal transmits a notification indicating that a connection with the second cell is completed. The processor performs processes of receiving, from the second base station, information via the first base station, wherein the information indicates first information for adjusting a transmission timing of the notification and second information on a radio resource for transmitting the notification to the second base station, connecting with the second cell, determining that the user terminal omits the transmission of the random access preamble signal, on a basis of the first information, and transmitting the notification to the second base station by use of the second information in response to the determination.

BRIEF DESCRIPTION OF THE DRAWINGS

FIG. 8 is an explanatory diagram for describing a method of establishing a downlink synchronization.

FIG. 10 is a flow for determining omission of transmitting a random access preamble signal.

FIG. 11 is a sequence diagram showing an operation example of a mobile communication system according to a second embodiment.

FIG. 12 is a sequence diagram showing an operation example of a mobile communication system according to a third embodiment.

DESCRIPTION OF THE EMBODIMENT

Overview of Embodiment

Figure 1:
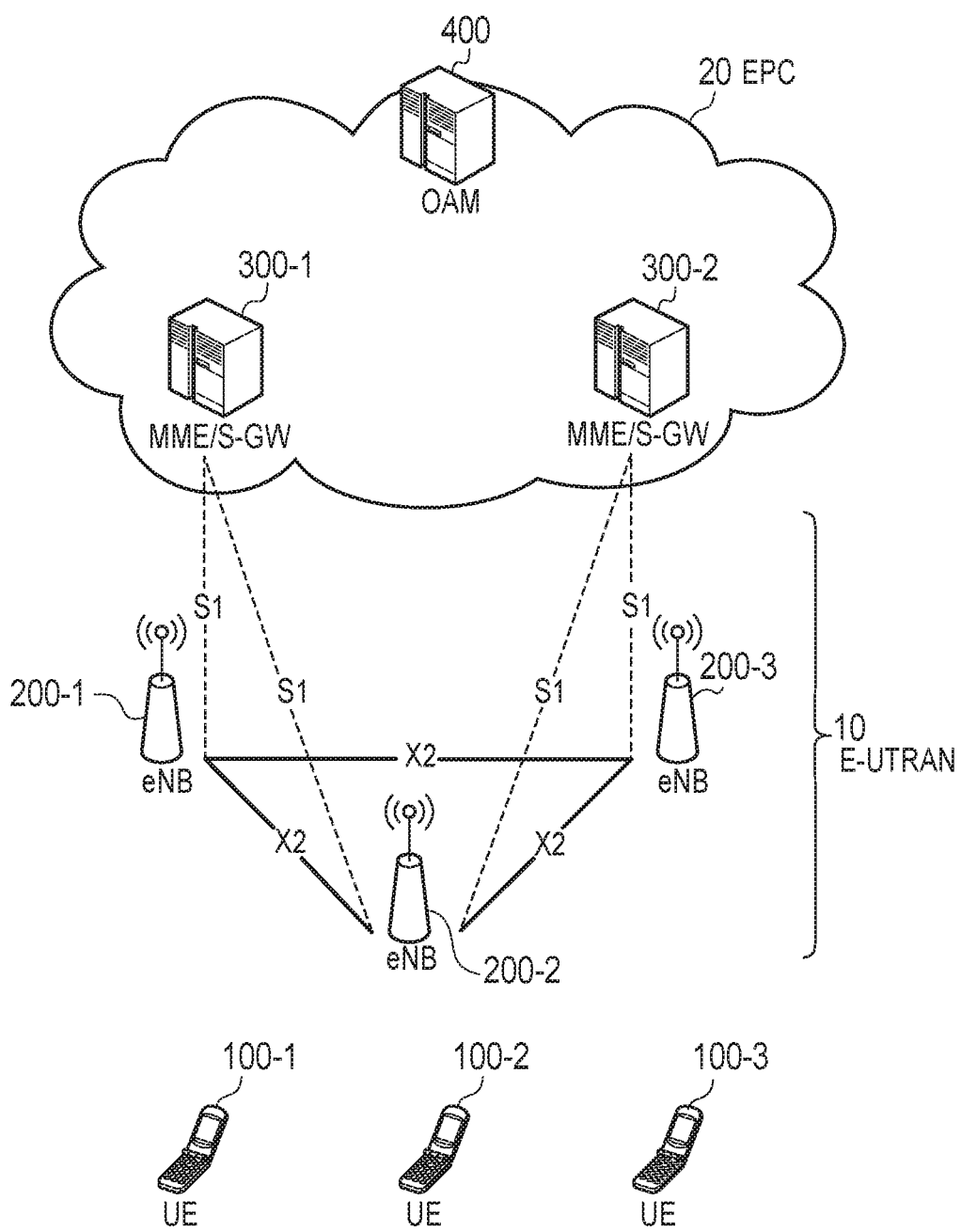
FIG. 1 is a configuration diagram of an LTE system according to an embodiment.

A user terminal according to an embodiment is a user terminal configured to transmit, to a target cell, a random access preamble signal for establishing an uplink synchronization with the target cell when a handover procedure from a source cell to the target cell is performed. The user terminal comprises: a controller configured to perform control of omitting transmission of the random access preamble signal to the target cell when a base station that manages the target cell receives an uplink signal from the user terminal by CoMP in which a plurality of cells including the source cell and the target cell cooperate with one another to perform communication before the handover procedure is performed.

The user terminal according to the embodiment further comprises a receiver configured to receive, from the source cell, radio resource assignment for transmitting, to the target cell, a connection complete notification indicating that a connection with the target cell is completed. When the receiver receives the radio resource assignment, the controller performs control of omitting the transmission of the random access preamble signal and transmitting the connection complete notification to the target cell on the basis of the radio resource assignment.

In the user terminal according to the embodiment, the receiver receives, from the source cell, at least one of timing information for adjusting a timing of transmitting the connection complete notification and power information for adjusting transmission power by which the connection complete notification is transmitted.

In the user terminal according to the embodiment, the timing information is a difference between a timing at which the base station or another base station that manages the source cell receives the uplink signal from the user terminal, and a timing at which the base station that manages the target cell receives the uplink signal from the user terminal, and the controller adjusts the timing of transmitting the connection complete notification on the basis of the difference.

The user terminal according to a modification of a first embodiment, further comprises a transmitter configured to transmit, to the source cell, a measurement result concerning a radio situation of a radio signal received by the user terminal. The controller stores a timing advance, used in transmitting the measurement result, for adjusting a transmission timing to the source cell, the receiver receives information indicating a latest timing advance for adjusting the transmission timing to the source cell, together with the timing information, and when a difference between the timing advance and the latest timing advance is equal to or less than a threshold value, the controller performs the control of omitting transmission of the random access preamble signal.

In a second embodiment, when the receiver receives downlink signals from the source cell and the target cell by using the same radio resource by the CoMP before the handover procedure is performed, the controller performs control of omitting establishment of a downlink synchronization with the target cell.

A base station according to the embodiment is a base station configured to receive, from a user terminal, a random access preamble signal for establishing an uplink synchronization when a handover procedure from a source cell to a target cell is performed and manage the target cell. The base station comprises: a transmitter configured to notify the user terminal of information for causing the user terminal to omit transmission of the random access preamble signal to the target cell, when receiving an uplink signal from the user terminal by CoMP in which a plurality of cells including the source cell and the target cell cooperate with one another to perform communication before the handover procedure is performed.

In the base station according to the embodiment, the transmitter notifies the user terminal, via the source cell, of radio resource assignment for transmitting, to the target cell, a connection complete notification as the information for causing omission of transmitting the random access preamble signal, the connection complete notification indicating that the user terminal has completed a connection with the target cell.

In the base station according to the modification of the first embodiment, the transmitter omits transmission of information indicating a signal sequence that is used for transmitting the random access preamble signal, instead of transmitting the information for causing omission of transmitting the random access preamble signal.

In the base station according to the embodiment, the transmitter notifies the user terminal of at least one of timing information for adjusting a timing of transmitting the connection complete notification and power information for adjusting transmission power by which the connection complete notification is transmitted.

In the base station according to the embodiment, the timing information is a difference between a timing at which the base station or another base station that manages the source cell receives the uplink signal from the user terminal, and a timing at which the base station that manages the target cell receives the uplink signal from the user terminal.

In the base station according to the modification of the first embodiment, the timing information is a timing advance for adjusting a transmission timing to the target cell.

The base station according to the embodiment further comprises a receiver configured to omit a process of receiving data that has not been transmitted from another base station that manages the source cell to the user terminal when the controller stores data to be transmitted to the user terminal by the CoMP before the handover procedure is performed.

First Embodiment

Hereinafter, with reference to the accompanying drawings, description will be provided for an embodiment in a case where a D2D communication is introduced in a mobile communication system (a LTE system) which is configured to comply with the 3GPP standards.

(LTE System)

FIG. 1 is a configuration diagram of an LTE system according to the present embodiment. As illustrated in FIG. 1, the LTE system includes a plurality of UEs (User Equipments) 100, an E-UTRAN (Evolved Universal Terrestrial Radio Access Network) 10, and an EPC (Evolved Packet Core) 20. The E-UTRAN 10 corresponds to a radio access network, and the EPC 20 corresponds to a core network. The E-UTRAN 10 and the EPC 20 constitute a network of the LTE system.

The UE 100 is a mobile communication device and performs radio communication with a serving cell. The UE 100 corresponds to the user terminal.

The E-UTRAN 10 includes a plurality of eNBs 200 (evolved Node-Bs). The eNB 200 corresponds to a base station. Each eNB 200 controls a cell or a plurality of cells and performs radio communication with the UE 100 with which a connection with the cell of itself is established. It is noted that the "cell" is used as a term indicating a minimum unit of a radio communication area, and is also used as a term indicating a function of performing radio communication with the UE 100.

The eNB 200 has, for example, a radio resource management (RRM) function, a routing function of user data, and a measurement control function for mobility control and scheduling.

The EPC 20 includes a plurality of MMEs (Mobility Management Entity)/S-GWs (Serving-Gateways) 300. The MME is a network node for performing various mobility controls, for example, for the UE 100, and corresponds to a controller. The S-GW is a network node that performs transfer control of user data and corresponds to a mobile switching center. The EPC 20 constituted by MME/S-GW 300 accommodates the eNB 200.

The eNBs 200 are connected mutually via an X2 interface. Furthermore, the eNB 200 is connected to the MME/S-GW 300 via an S1 interface.

Next, the configurations of the UE 100 and the eNB 200 will be described.

Figure 2:
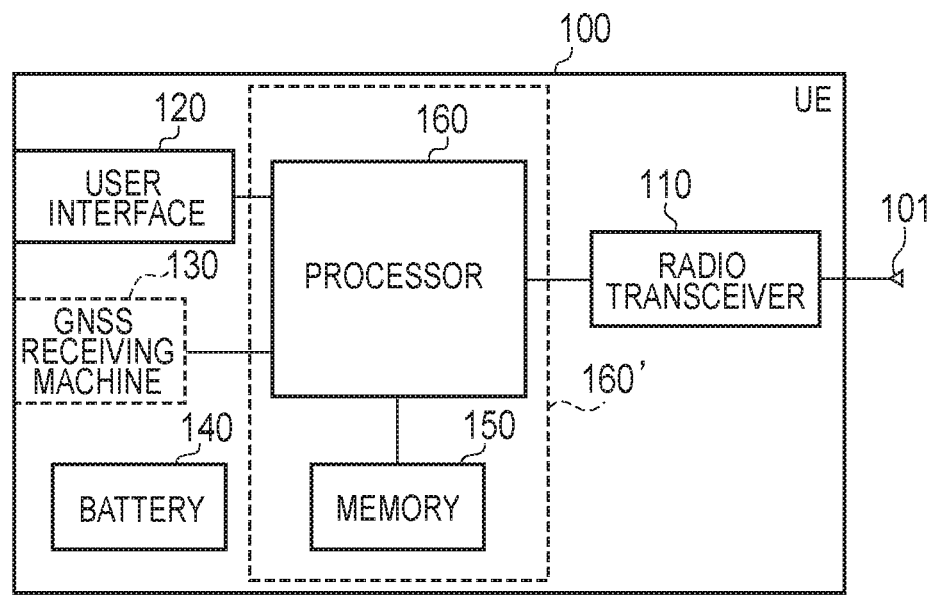
FIG. 2 is a block diagram of a UE according to the embodiment.

FIG. 2 is a block diagram of the UE 100. As illustrated in FIG. 2, the UE 100 includes an antenna 101, a radio transceiver 110, a user interface 120, a GNSS (Global Navigation Satellite System) receiver 130, a battery 140, a memory 150, and a processor 160. The memory 150 and the processor 160 constitute a controller.

The controller in the present embodiment performs the control of omitting transmission of the random access preamble signal to the target cell when the eNB 200 that manages the target cell receives an uplink signal from the UE 100 by the CoMP in which the source cell and the target cell cooperate with one another to perform communication before the handover procedure is performed.

The UE 100 may not have the GNSS receiver 130. Furthermore, the memory 150 may be integrally formed with the processor 160, and this set (that is, a chipset) may be called a processor 160' constituting a controller.

The antenna 101 and the radio transceiver 110 are used to transmit and receive a radio signal. The antenna 101 includes a plurality of antenna elements. The radio transceiver 110 converts a baseband signal output from the processor 160 into the radio signal, and transmits the radio signal from the antenna 101. Furthermore, the radio transceiver 110 converts the radio signal received by the antenna 101 into the baseband signal, and outputs the baseband signal to the processor 160.

The user interface 120 is an interface with a user carrying the UE 100, and for example, includes a display, a microphone, a speaker, various buttons and the like. The user interface 120 receives an operation from a user and outputs a signal indicating the content of the operation to the processor 160. The GNSS receiver 130 receives a GNSS signal in order to obtain location information indicating a geographical location of the UE 100, and outputs the received signal to the processor 160. The battery 140 accumulates a power to be supplied to each block of the UE 100.

The memory 150 stores a program to be executed by the processor 160 and information to be used for a process by the processor 160. The processor 160 includes a baseband processor that performs modulation and demodulation, encoding and decoding and the like of a baseband signal, and a CPU (Central Processing Unit) that performs various processes by executing the program stored in the memory 150. The processor 160 may further include a codec that performs encoding and decoding of sound and video signals. The processor 160 implements various processes and various communication protocols described later.

Figure 3:
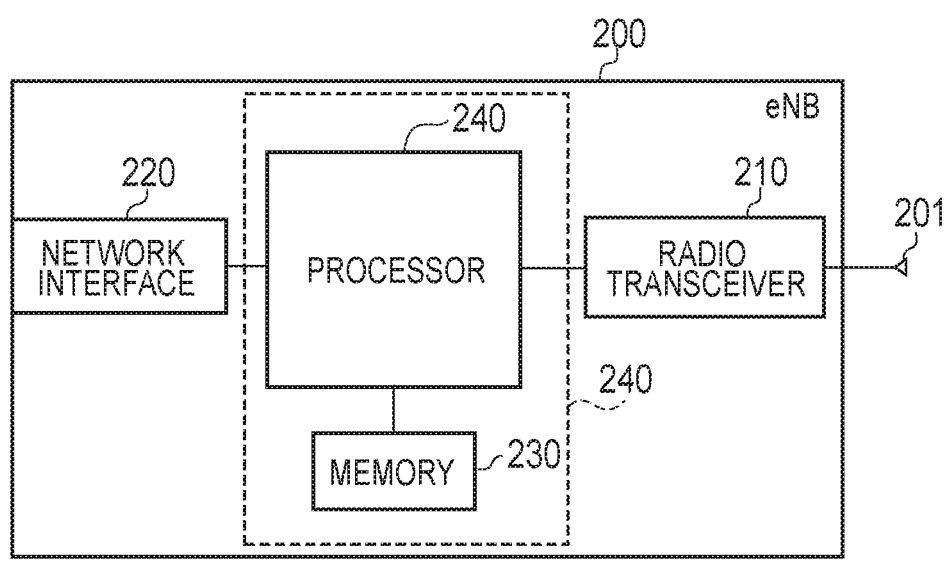
FIG. 3 is a block diagram of an eNB according to the embodiment.

FIG. 3 is a block diagram of the eNB 200. As illustrated in FIG. 3, the eNB 200 includes an antenna 201, a radio transceiver 210, a network interface 220, a memory 230, and a processor 240. The memory 230 and the processor 240 constitute a controller. Further, the memory 230 may be integrally formed with the processor 240, and this set (that is, a chipset) may be called a processor 240' constituting a controller.

The controller in the present embodiment performs control of transmitting information for causing the UE 100 to omit the transmission of the random access preamble signal to the target cell when the uplink signal is received from the UE 100 by the CoMP in which the source cell and the target cell cooperate with one another to perform communication before the handover procedure is performed. Accordingly, the radio transceiver 210 transmits the information for causing omission of transmitting the random access preamble signal.

The antenna 201 and the radio transceiver 210 are used to transmit and receive a radio signal. The antenna 102 includes a plurality of antenna elements. The radio transceiver 210 converts the baseband signal output from the processor 240 into the radio signal, and transmits the radio signal from the antenna 201. Furthermore, the radio transceiver 210 converts the radio signal received by the antenna 201 into the baseband signal, and outputs the baseband signal to the processor 240.

The network interface 220 is connected to the neighbor eNB 200 via the X2 interface and is connected to the MME/S-GW 300 via the S1 interface. The network interface 220 is used in communication performed on the X2 interface and communication performed on the S1 interface.

The memory 230 stores a program to be executed by the processor 240 and information to be used for a process by the processor 240. The processor 240 includes a baseband processor that performs modulation and demodulation, encoding and decoding and the like of a baseband signal, and a CPU that performs various processes by executing the program stored in the memory 230. The processor 240 implements various processes and various communication protocols described later.

Figure 4:
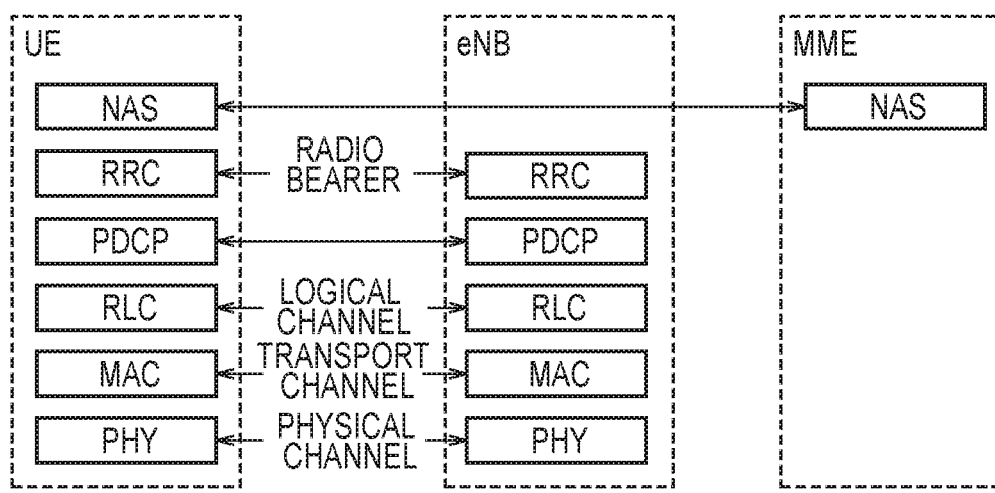
FIG. 4 is a protocol stack diagram of a radio interface in the LTE system.

FIG. 4 is a protocol stack diagram of a radio interface in the LTE system. As illustrated in FIG. 4, the radio interface protocol is classified into a layer 1 to a layer 3 of an OSI reference model, wherein the layer 1 is a physical (PHY) layer. The layer 2 includes a MAC (Medium Access Control) layer, an RLC (Radio Link Control) layer, and a PDCP (Packet Data Convergence Protocol) layer. The layer 3 includes an RRC (Radio Resource Control) layer.

The PHY layer performs encoding and decoding, modulation and demodulation, antenna mapping and demapping, resource mapping and demapping. Between the PHY layer of the UE 100 and the PHY layer of the eNB 200, data is transmitted via the physical channel.

The MAC layer performs preferential control of data, and a retransmission process and the like by hybrid ARQ (HARQ). Between the MAC layer of the UE 100 and the MAC layer of the eNB 200, data is transmitted via a transport channel. The MAC layer of the eNB 200 includes a scheduler for determining a transport format (a transport block size, a modulation and coding scheme (MCS), and the like) of an uplink and a downlink, and an assignment resource block.

The RLC layer transmits data to an RLC layer of a reception side by using the functions of the MAC layer and the PHY layer. Between the RLC layer of the UE 100 and the RLC layer of the eNB 200, data is transmitted via a logical channel.

The PDCP layer performs header compression and decompression, and encryption and decryption.

The RRC layer is defined only in a control plane. Between the RRC layer of the UE 100 and the RRC layer of the eNB 200, a control message (an RRC message) for various types of setting is transmitted. The RRC layer controls the logical channel, the transport channel, and the physical channel in response to establishment, re-establishment, and release of a radio bearer. When there is an RRC connection between the RRC of the UE 100 and the RRC of the eNB 200, the UE 100 is in a connected state (an RRC connected state), and when there is no RRC connection, the UE 100 is in an idle state (an RRC idle state).

A NAS (Non-Access Stratum) layer positioned above the RRC layer performs session management, mobility management and the like.

Figure 5:
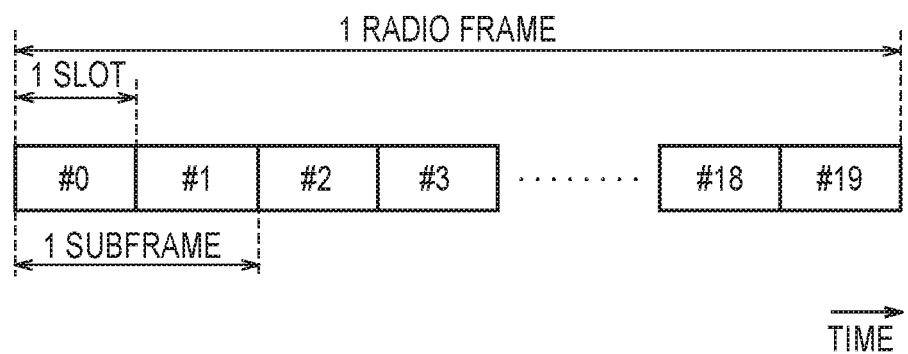
FIG. 5 is a configuration diagram of a radio frame used in the LTE system.

FIG. 5 is a configuration diagram of a radio frame used in the LTE system. In the LTE system, OFDMA (Orthogonal Frequency Division Multiplexing Access) is applied to a downlink, and SC-FDMA (Single Carrier Frequency Division Multiple Access) is applied to an uplink, respectively.

As illustrated in FIG. 5, the radio frame is configured by 10 subframes arranged in a time direction, wherein each subframe is configured by two slots arranged in the time direction. Each subframe has a length of 1 ms and each slot has a length of 0.5 ms. Each subframe includes a plurality of resource blocks (RBs) in a frequency direction, and a plurality of symbols in the time direction. Each symbol is provided at a head thereof with a guard interval called a cyclic prefix (CP). The resource block includes a plurality of subcarriers in the frequency direction. A radio resource unit composed of one subcarrier and one symbol is called a resource element (RE).

Among radio resources assigned to the UE 100, a frequency resource can be designated by a resource block and a time resource can be designated by a subframe (or a slot).

In the downlink, an interval of several symbols at the head of each subframe is a control region mainly used as a physical downlink control channel (PDCCH) for transmission of a control signal. Furthermore, the remaining interval of each subframe is a region that can mainly be used as a physical downlink shared channel (PDSCH) for transmission of user data.

In the downlink, reference signals such as a cell specific reference signal (CRS) and/or a channel state information reference signal (CSI-RS) are arranged in each sub-frame in a distributed manner. The reference signal is formed of a predetermined orthogonal signal sequence and arranged in a predetermined resource element.

In an uplink, both ends in the frequency direction of each sub-frame are control regions mainly used as a physical uplink control channel (PUCCH) for transmission of a control signal. A center portion in the frequency direction of each sub-frame is a region that can mainly be used as a physical uplink shared channel (PUSCH) for transmission of user data.

(Operation Environment of Mobile Communication System)

Figure 6:
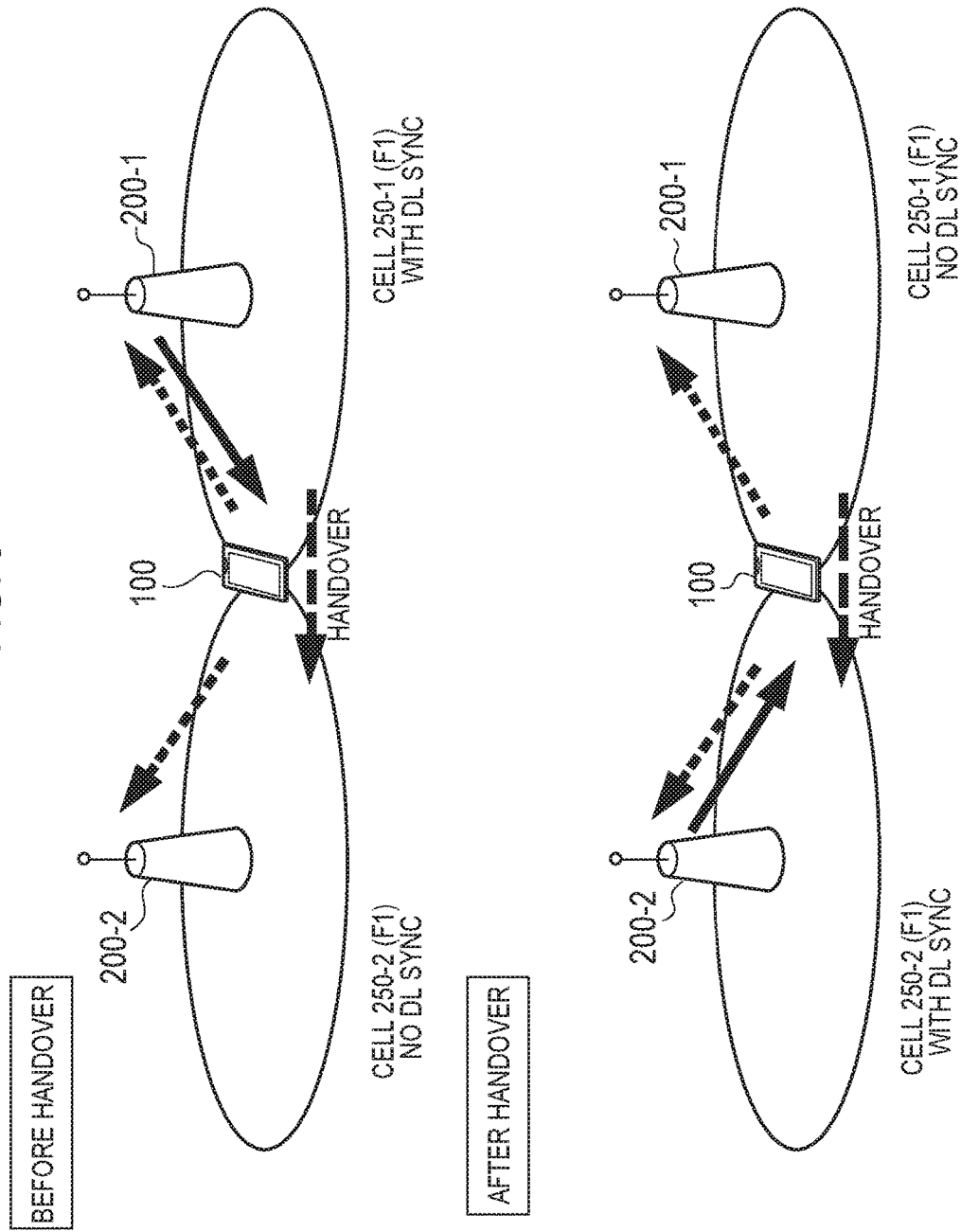
FIG. 6 is an explanatory diagram for describing an operation environment of a mobile communication system according to a first embodiment.

Next, by using FIG. 6, an operation environment of a mobile communication system according to the present embodiment will be described. FIG. 6 is an explanatory diagram for describing the operation environment of the mobile communication system according to the present embodiment.

As shown in FIG. 6, an eNB 200-1 that manages a cell 250-1 and an eNB 200-2 that manages a cell 250-2 receive an uplink signal from a UE 100-1 by the CoMP in which the cell 250-1 and the cell 250-2 cooperate with one another to perform communication before the handover procedure from the cell 250-1 to the cell 250-2 is performed. The cell 250-1 and the cell 250-2 cooperate with one another to perform the CoMP in an uplink with the UE 100-1 by using the same frequency band (F1).

On the other hand, the UE 100 establishes an RRC connection with the cell 250-1 (the eNB 200-1). The UE 100 receives a downlink signal from the cell 250-1 and establishes a downlink synchronization with the cell 250-1. On the other hand, the UE 100 does not establish a downlink synchronization with the cell 250-2.

Further, as shown in FIG. 6, after the handover procedure from the cell 250-1 to the cell 250-2 is performed, the eNB 200-1 and the eNB 200-2 receive the uplink signal from the UE 100 by the CoMP in the uplink.

On the other hand, after the handover procedure is performed, the UE 100 establishes an RRC connection with the cell 250-2 (the eNB 200-2). The UE 100 receives a downlink signal from the cell 250-2 and establishes the downlink synchronization with the cell 250-2. On the other hand, the UE 100 does not establish the downlink synchronization with the cell 250-1.

(Operation Overview of Mobile Communication System)

Figure 7:
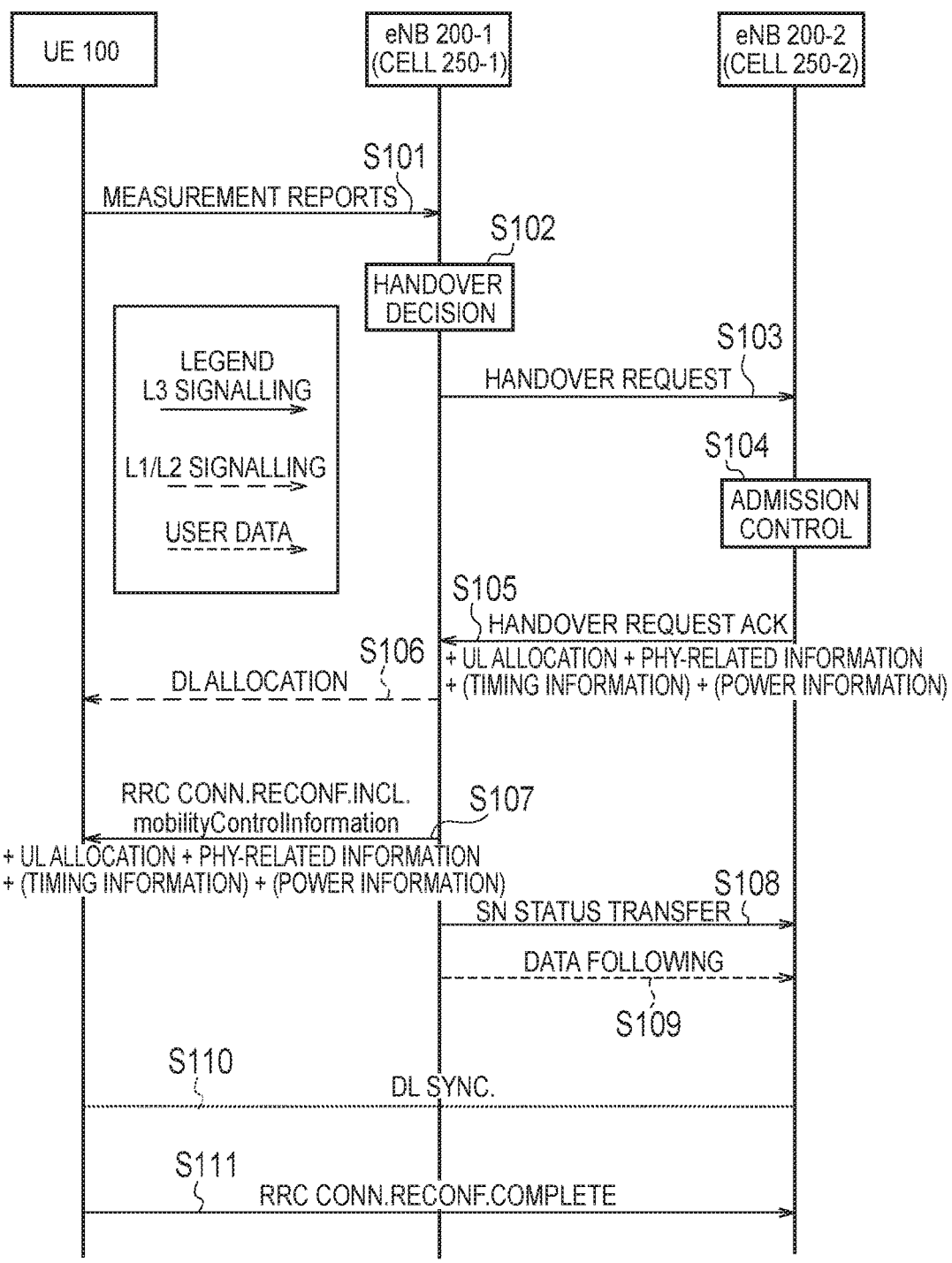
FIG. 7 is an operation overview of the mobile communication system according to the first embodiment.

Next, by using FIG. 7 and FIG. 8, an operation overview of the mobile communication system according to the present embodiment will be described. FIG. 7 is an operation overview of the mobile communication system according to a first embodiment. FIG. 8 is an explanatory diagram for describing a method of establishing a downlink synchronization.

As described in the above-described operation environment of the mobile communication system, the cell 250-1 and the cell 250-2 cooperate with one another to perform the CoMP in the uplink with the UE 100-1. The UE 100 establishes the RRC connection with the cell 250-1 (the eNB 200-1). The cell 250-1 is a source cell (and a serving cell), and the cell 250-2 is a target cell.

It is noted that, in FIG. 7, types of arrows indicate types of signals or types of data. Specifically, a normal arrow indicates a signal by a layer 3 (L3), a long-dashed-line arrow indicates a signal by a layer 1 (L1)/a layer 2 (L2), and a short-dashed-line arrow indicates transfer of user data.

As shown in FIG. 7, in step S101, the UE 100 transmits regularly or irregularly, to the cell 250-1 (the eNB 200-1), a measurement result (Measurement Report) on a radio situation of a radio signal received by the UE 100 from the eNB 200 in the neighborhood. The eNB 200-1 receives the measurement result.

In step S102, the eNB 200-1 decides whether or not to cause the UE 100 to perform handover on the basis of the measurement result. Specifically, in the case of determining that a radio situation is better for the UE 100 when the UE 100 establishes the RRC connection with the cell 250-2 rather than the cell 250-1, the eNB 200-1 decides to cause the UE 100 to perform the handover. For example, when received power that is received by the UE 100 from the cell 250-2 is above a value obtained by adding a predetermined offset to received power that is received by the UE 100 from the cell 250-1, the eNB 200-1 decides to cause the UE 100 to perform the handover.

The following description will be given on the assumption that the eNB 200-1 has decided to cause the UE 100 to perform the handover to the cell 250-2.

In step S103, the eNB 200-1 transmits a handover request (Handover Request) to the eNB 200-2 that manages the cell 250-2. The eNB 200-2 receives the handover request.

The handover request includes an identifier of the cell 250-1 of a handover source and an identifier of the UE 100.

In step S104, the eNB 200-2 determines whether or not to admit the handover request. When admitting the handover request, the eNB 200-2 performs a process of step S105. On the other hand, when admitting the handover request, the eNB 200-2 transmits a handover request negative acknowledgment (Handover Request Nack) to the eNB 200-1.

Further, the eNB 200-2 may determine whether or not to adjust a transmission timing of the UE 100 and may determine whether or not to adjust transmission power of the UE 100.

The following description will be given on the assumption that the eNB 200-2 has determined to admit the handover request.

In step S105, the eNB 200-2 transmits a handover request acknowledgment (Handover Request Ack) to the eNB 200-1. The eNB 200-1 receives the handover request acknowledgment.

Before transmitting the handover request acknowledgment, the eNB 200-2 determines whether or not the cell 250-1 of the handover source and the cell 250-2 managed by the eNB 200-2 perform the CoMP in the uplink to the UE 100 that performs the handover on the basis of the identifier of the cell 250-1 and the identifier of the UE 100.

When determining that the cell 250-1 and the cell 250-2 do not perform the CoMP to the UE 100, the eNB 200-2 performs a normal process of causing the UE 100 to transmit the random access preamble signal. For example, the eNB 200-2 selects a signal sequence to be used for transmitting the random access preamble signal from among signal sequences for Contention Free Access. The eNB 200-2 transmits the selected signal sequence to the eNB 200-1 together with the handover request acknowledgment in order to notify the UE 100 of the selected signal sequence.

It is noted that, the random access preamble signal is a signal that is used so that the UE 100 establishes an uplink synchronization with the cell 250-2 that is a cell of a handover destination and a signal transmitted by the UE 100 to the cell 250-2.

On the other hand, when determining that the cell 250-1 and the cell 250-2 perform the CoMP to the UE 100, the eNB 200-2 notifies the UE 100 of the information for causing the omission of transmitting the random access preamble signal. In the present embodiment, the information for causing the omission of transmitting the random access preamble signal is radio resource assignment (UL Allocation) indicating a radio resource for transmitting the connection complete notification to the cell 250-2.

It is noted that, the connection complete notification is a notification indicating that the UE 100 has completed the RRC connection with the cell 250-2.

In the present embodiment, the eNB 200-2 omits a notification of a signal sequence to the UE 100 instead of notifying the above-described radio resource assignment. The eNB 200-2 may not select a signal sequence of the random access preamble signal.

Further, in the present embodiment, the eNB 200-2 transmits, to the eNB 200-1, physics-related information (PHY-related information), timing information, and power information together with the handover request acknowledgment.

The physics-related information is information that is notified to the UE 100 by using downlink control information for an uplink grant.

The timing information is information for adjusting a timing at which the UE 100 transmits the connection complete notification. For example, the timing information is a timing at which the UE 100 notifies the connection complete notification, and the timing is designated by a combination of a system frame number (SFN) and a subframe number. Further, the timing information may include a difference of a timing $\Delta TA$ between the eNB 200-1 that manages the cell 250-1 and the eNB 200-2 that manages the cell 250-2 receiving the same uplink signal from the UE 100.

The power information is information for adjusting the transmission power by which the UE 100 transmits the connection complete notification.

It is noted that, when determining not to adjust the transmission timing of the UE 100, the eNB 200-1 may not transmit the timing information to the eNB 200-1, and when determining not to adjust the transmission power of the UE 100, the eNB 200-1 may not transmit the power information to the eNB 200-1.

In step S106, when receiving the handover request acknowledgment, the eNB 200-1 transmits downlink radio resource assignment (DL allocation) to the UE 100. The UE 100 receives the downlink radio resource assignment.

The downlink radio resource assignment indicates a radio resource that is used for receiving RRC connection reestablishment information or the like transmitted by the eNB 200-1 to the UE 100 in step S107.

In step S107, the eNB 200-1 transmits, to the UE 100, RRC connection reestablishment information (RRC Conn.Reconf.) including mobility control information (mobilityControlinformation) by using the downlink radio resource assignment. The UE 100 receives the RRC connection reestablishment information.

The eNB 200-1 transmits information received from the eNB 200-2 in step S105, specifically, the radio resource assignment, the physics-related information, the timing information, and the power information, together with the RRC connection reestablishment information.

The UE 100 determines to omit the transmission of the random access preamble signal to the cell 250-2 on the basis of receiving the radio resource assignment indicating the radio resource for transmitting the connection complete notification to the cell 250-2, together with the RRC connection reestablishment information.

In step S108, the eNB 200-1 transmits a sequence number (SN) of the transmission data to the UE 100 to the eNB 200-2. The eNB 200-2 receives the sequence number. This prevents interruption in reception data because of performing the handover.

In step S109, the eNB 200-1 transmits, to the eNB 200-2, data that has not been transmitted to the UE 100. The eNB 200-2 receives the data that has not been transmitted.

In step S110, as shown in FIG. 8(*a*), the UE 100 receives a synchronization channel (sync channel) from the eNB 200-2, and establishes the downlink synchronization with the cell 250-2 on the basis of the received synchronization channel.

In step S111, the UE 100 transmits, to the cell 250-2, a connection complete notification (RRC Conn. Reconf. Complete) indicating that the RRC connection with the cell 250-2 is completed. The eNB 200-2 receives the connection complete notification.

The UE 100 transmits the connection complete notification to the cell 250-2 by using the radio resource assignment notified via the eNB 200-1 from the eNB 200-2.

The UE 100 is able to adjust a timing of transmitting the connection complete notification to the cell 250-2 by a method described below.

First, while establishing a connection with the cell 250-1, the UE 100 receives, from the cell 250-1, a timing advance $TA_A$ for the UE 100 to adjust a transmission timing to the cell 250-1. As shown in FIG. 8(*b*), before the handover procedure is performed, in view of a time difference until when a signal from the UE 100 reaches the eNB 200-1 that manages the cell 250-1, the UE 100 transmits an uplink signal U1 to the cell 250-1 at a timing earlier than a downlink signal A1 from the cell 250-1 by the timing advance $TA_A$.

Next, as shown in FIG. 8(*c*), the UE 100 calculates a reception timing difference Δreftime between a downlink signal A2 from the cell 250-1 and a downlink signal B2 from the cell 250-2. The UE 100 calculates a timing advance $TA_B$ for adjusting the transmission timing to the cell 250-2 on the basis of the following formula (1).

$$TA_B = TA_A - \Delta reftime \quad (-\infty \leq \Delta reftime \leq \infty) \quad (1)$$

The UE 100 transmits an uplink signal U2 at a timing earlier than the downlink signal B2 from the cell 250-2 by the timing advance $TA_B$.

It is noted that, when receiving the difference of a timing ΔTA between the eNB 200-1 that manages the cell 250-1 and the eNB 200-2 that manages the cell 250-2 receiving the same uplink signal from the UE 100 as timing information from the eNB 200-1, the UE 100 may calculate a timing advance $TA_B'$ for adjusting the transmission timing to the cell 250-2 on the basis of the following formula (2).

$$TA_B' = TA_A - \Delta reftime + \Delta TA \quad (-\infty \leq \Delta TA \leq \infty) \quad (2)$$

In the present embodiment, the UE 100 is able to transmit the connection complete notification on the basis of the calculated timing advance $TA_B$ (or $TA_B'$). Further, in the case of having received the power information, the UE 100 is able to transmit the connection complete notification by transmission power based on the power information.

It is noted that, the UE 100 may perform communication with the cell 250-2 by a notified radio resource, an adjusted timing advance, and adjusted transmission power after the handover procedure is completed.

Modification of First Embodiment

Next, by using FIG. 9 and FIG. 10, a mobile communication system according to a modification of the first embodiment will be described.

Figure 9:
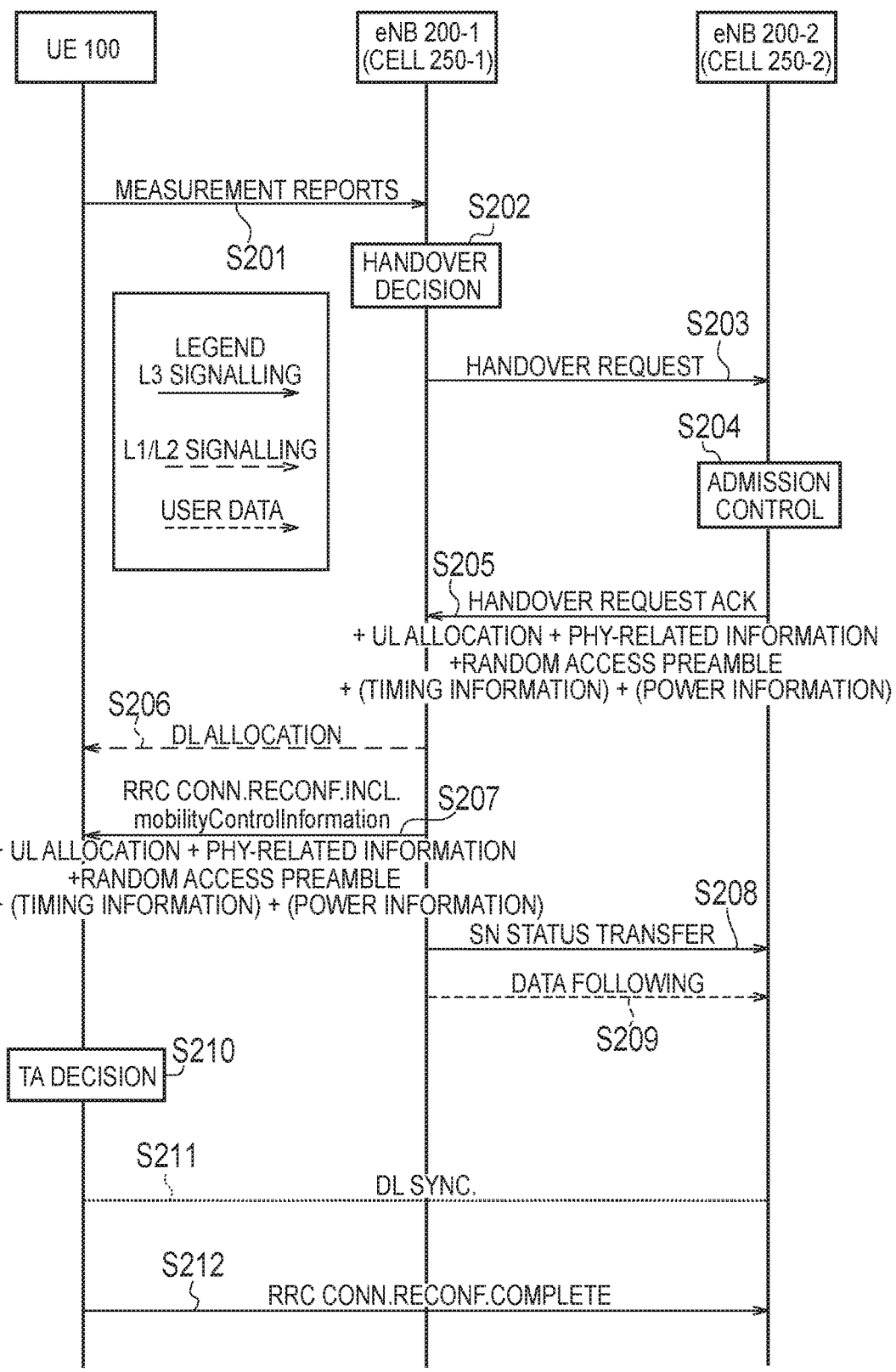
FIG. 9 is a sequence diagram showing an operation example of a mobile communication system according to a modification of the first embodiment.

FIG. 9 is a sequence diagram showing an operation example of the mobile communication system according to the modification of the first embodiment. FIG. 10 is a flow for determining the omission of transmitting the random access preamble signal.

In the above-described embodiment, the eNB 200-1 omits the notification of a signal sequence that is used for transmitting the random access preamble signal, however, in the present modification, the eNB 200-1 does not omit the notification of the signal sequence that is used for transmitting the random access preamble signal. Therefore, the UE 100 determines whether or not to omit the transmission of the random access preamble signal depending on the situation.

It is noted that a description will be provided while focusing on a portion different from the above-described embodiment, and a description of a similar portion will be omitted, where necessary.

As shown in FIG. 9, steps S201 to S204 correspond to steps S101 to S104 in FIG. 7.

In the present modification, in step S201, the UE 100 stores a timing advance $TA_{A1}$ for adjusting the transmission timing to the cell 250-1 that has been used in transmitting the measurement result.

In step S205, the eNB 200-2 transmits, to the eNB 200-1, information indicating the signal sequence that is used for transmitting the random access preamble signal (Random Access Preamble), together with the handover request acknowledgment (the Handover Request Ack). The eNB 200-1 receives the information indicating the signal sequence, the radio resource assignment, the physics-related information, the timing information, and the power information, together with the handover request acknowledgment.

In the present modification, the timing information is information indicating the difference of the timing ΔTA between the eNB 200-1 and the eNB 200-2 receiving the same uplink signal from the UE 100.

Step S206 corresponds to step S106.

In step S207, the eNB 200-1 transmits, to the UE 100, information received from the eNB 200-2 in step S205 together with the RRC connection reestablishment information, specifically, the information indicating the signal sequence, the radio resource assignment, the physics-related information, the timing information, and the power information.

It is noted that, in the present modification, the eNB 200-1 transmits timing information indicating a latest timing advance $TA_{A2}$ for adjusting the transmission timing to the cell 250-1, together with the timing information from the eNB 200-2.

Steps S208 and S209 correspond to steps S108 and S109.

In step S210, the UE 100 determines whether or not to omit the transmission of the random access preamble signal to the cell 250-2.

Specifically, as shown in FIG. 10, in step S210, the UE 100 performs a process of step S251 shown in FIG. 10.

In step S251, the UE 100 compares the timing advance $TA_{A1}$ stored in step S201 with the latest timing advance $TA_{A2}$. When a difference between the timing advance $TA_{A1}$ and the latest timing advance $TA_{A2}$ is equal to or less than a threshold value, the UE 100 determines to omit the transmission of the random access preamble signal (step S252).

It is noted that, in the present modification, the threshold value is a value of a range in which shift of the transmission timing to the cell 250-1 is acceptable.

When determining to omit the transmission of the random access preamble signal, the UE 100 performs processes of steps S211 and S212. Steps S211 and S212 correspond to steps S110 and S111 of the first embodiment.

It is noted that, in step S212, as described in step S111 of the above-described first embodiment, the UE 100 may calculate the timing advance $TA_B'$ for adjusting the transmission timing to the cell 250-2 on the basis of the difference ΔTA. In this case, the UE 100 preferably calculates the timing advance $TA_B'$ by using the latest timing advance $TA_{A2}$.

On the other hand, when the difference is larger than the threshold value, the UE 100 determines not to omit the transmission of the random access preamble signal. When determining to omit the transmission of the random access preamble signal, the UE 100 transmits, to the cell 250-2, the random access preamble signal on the basis of the information indicating the signal sequence similarly to a normal handover procedure (step S253). The eNB 200-2 that manages the cell 250-2 receives the random access preamble signal. The eNB 200-2 generates a timing advance for adjusting a timing at which the UE 100 transmits the uplink signal on the basis of a reception timing of the random access preamble signal. Then, the eNB 200-2 transmits, to the UE 100, a random access response including timing information indicating the generated timing advance. The UE 100 transmits the connection complete notification to the cell 250-2 on the basis of the transmitted timing information.

Summary of First Embodiment

In the present embodiment, the UE 100 (controller) omits the transmission of the random access preamble signal to the cell 250-2 when the eNB 200-2 that manages the cell 250-2 receives the uplink signal from the UE 100-1 by the CoMP in which the cell 250-1 and the cell 250-2 cooperate with one another to perform communication before the handover procedure is performed. Accordingly, the UE 100 does not transmit the random access preamble signal, thus making it possible to prevent occurrence of interference based on the transmission of the random access preamble signal. Further, when performing the CoMP in which the cell 250-1 and the cell 250-2 cooperate with one another to perform communication, the UE 100 is present at the cell-edge of the cell 250-1 and the cell-edge of the cell 250-2. Therefore, a timing of receiving the uplink signal from the UE 100 is substantially coincided in the eNB 200-1 and the eNB 200-2. Therefore, even when a timing of transmitting the uplink signal to the cell 250-2 is not adjusted by the random access preamble signal, the eNB 200-2 is able to receive the uplink signal from the UE 100. Further, the UE 100 is able to proceed with the handover procedure even when not transmitting the random access preamble signal, and thus the UE 100 is able to establish the connection with the cell 250-2 more promptly.

Further, in the present embodiment, the eNB 200-2 (the radio transceiver 210) notifies the UE 100 of information for causing the UE 100 to omit the transmission of the random access preamble signal to the cell 250-2 when the eNB 200-2 that manages the cell 250-2 receives the uplink signal from the UE 100-1 by the CoMP in which the cell 250-1 and the cell 250-2 cooperate with one another to perform communication before the handover procedure is performed. Accordingly, as described above, it is possible to prevent the occurrence of interference based on the transmission of the random access preamble signal.

Further, in the present embodiment, the eNB 200-2 (the radio transceiver 210) notifies the UE 100 of the radio resource assignment for transmitting the connection complete notification to the cell 250-2 as information for causing the omission of transmitting the random access preamble signal, via the cell 250-1. Further, when receiving the radio resource assignment notified from the eNB 200-2 via the eNB 200-1, the UE 100 (the controller) transmits the connection complete notification to the cell 250-2 on the basis of the radio resource assignment. Accordingly, the UE 100 is able to prevent the occurrence of interference even when omitting the transmission of the random access preamble signal and transmitting the connection complete notification.

The eNB 200-2 (the radio transceiver 210) omits transmission of information indicating the signal sequence that is used for transmitting the random access preamble signal, instead of transmitting the information for causing the omission of transmitting the random access preamble signal. Accordingly, it is not necessary to select the signal sequence, and thus it is possible to prevent depletion of a signal sequence for the Contention Free Access, of which the number is limited.

A reception timing and received power of an uplink signal are substantially coincided since the eNB 200-1 and the eNB 200-2 perform the CoMP in the uplink with the UE 100. However, in the present embodiment, the eNB 200-2 (the radio transceiver 210) notifies the UE 100 of at least one of timing information for adjusting the timing of transmitting the connection complete notification and power information for adjusting the transmission power by which the connection complete notification is transmitted, via the cell 250-1. Further, the UE 100 (the radio transceiver 110) receives, from the cell 250-1, at least one of the timing information and the power information. Accordingly, the UE 100 is able to transmit the connection complete notification at a more appropriate timing and by more appropriate transmission power, and thus the UE 100 is more capable of preventing the occurrence of interference.

Further, in the modification of the present embodiment, the UE 100 (the controller) stores a timing advance for adjusting the transmission timing to the cell 250-1. The UE 100 (controller) omits the transmission of the random access preamble signal on the basis of a difference ΔTA between the timing advance $TA_{A1}$ used in transmitting the measurement result and the latest timing advance $TA_{A2}$. Accordingly, when a timing advance is not changed greatly while the handover procedure is performed, the UE 100 omits the transmission of the random access preamble signal, and thus is able to transmit the connection complete notification at an appropriate timing.

Further, in the modification of the present embodiment, when the notification of the information indicating the signal sequence is not omitted, the eNB 200-2 (the radio transceiver 210) notifies the UE 100 of the radio resource assignment via the cell 250-1. Accordingly, the UE 100 is able to properly select whether or not to omit the transmission of the random access preamble signal.

Further, the eNB 200-2 (the radio transceiver 210) transmits, as timing information, the difference ΔTA between the timing at which the eNB 200-1 that manages the cell 250-1 receives the uplink signal from the UE 100 and the timing at which the eNB 200-2 that manages the cell 250-2 receives the uplink signal from the UE 100. Further, the UE 100 (the controller) adjusts the timing of transmitting the connection complete notification on the basis of the difference ΔTA. Accordingly, the UE 100 is able to transmit the connection complete notification at a more appropriate timing and by more appropriate transmission power, and thus the UE 100 is able to prevent the occurrence of interference based on the transmission of the connection complete notification.

Second Embodiment

Next, by using FIG. 11, a mobile communication system according to a second embodiment will be described. It is noted that a description will be provided while focusing on a portion different from the above-described first embodiment, and a description of a similar portion will be omitted, where necessary.

FIG. 11 is a sequence diagram showing an operation example of the mobile communication system according to the second embodiment.

In the above-described embodiment, the cell 250-1 and the cell 250-2 perform the CoMP in an uplink, and do not perform the CoMP in a downlink. In the present embodiment, the cell 250-1 and the cell 250-2 perform the CoMP not only in an uplink but also in a downlink. Specifically, by the CoMP in the downlink, the UE 100 receives a downlink signal from the cell 250-1 and the cell 250-2 by using the same radio resource.

As shown in FIG. 11, steps S301 to S310 correspond to steps S101 to S109 and S111 of the first embodiment. That is, in the second embodiment, a process of step S110 in which the UE 100 establishes the downlink synchronization with the cell 250-2, is omitted.

When the UE 100 (the radio transceiver 110) receives the downlink signal from the cell 250-1 and the cell 250-2 by using the same radio resource by the CoMP in the downlink, a timing of receiving the downlink signal from the cell 250-1 and a timing of receiving the downlink signal from the cell 250-2 are substantially coincided, and thus the UE 100 (the controller) is capable of omitting establishment of the downlink synchronization with the cell 250-2. Therefore, the UE 100 is able to establish the connection with the cell 250-2 more promptly.

Third Embodiment

Next, by using FIG. 12, a mobile communication system according to a third embodiment will be described. It is noted that a description will be provided while focusing a portion different from the above-described first and second embodiments, and a description of a similar portion will be omitted, where necessary.

FIG. 12 is a sequence diagram showing an operation example of the mobile communication system according to the third embodiment.

In the above-described embodiment, the cell 250-1 and the cell 250-2 perform the CoMP in an uplink, and do not perform the CoMP in a downlink. In the present embodiment, the cell 250-1 and the cell 250-2 perform JP (Joint Processing)-CoMP in a downlink in addition to the CoMP in an uplink.

Here, there are two schemes for the JP-CoMP in the downlink. One is JT (Joint Transmission) in which a plurality of points simultaneously perform transmission to a user terminal by using the same radio resource. Another one is DPS (Dynamic Point Selection) in which a plurality of points selectively perform transmission to a user terminal with securing the same radio resource. What both schemes of the JT and the DPS have in common is that a plurality of points share downlink transmission data.

As shown in FIG. 12, in step S401, the eNB 200-1 and the eNB 200-2 synchronize the sequence number (SN) of the transmission data to the UE 100 by the JP-CoMP in the downlink.

In step S402, the eNB 200-1 transmits, to the eNB 200-2, the transmission data to the UE 100.

Accordingly, before performing the handover procedure, the eNB 200-1 and the eNB 200-2 share the transmission data to the UE 100 in advance, and perform communication with the UE 100 by the JP-CoMP in the downlink.

Steps S403 to S410 correspond to steps S301 to S307 and S310 of the first embodiment. That is, in the third embodiment, during the handover procedure, omitted are a process of step S308 in which the eNB 200-1 transmits, to the eNB 200-2, the sequence number (SN) of the transmission data to the UE 100, and a process of step S309 in which the eNB 200-1 transmits, to the eNB 200-2, data that has not been transmitted to the UE 100.

When the eNB 200-2 (the controller) stores data to be transmitted to the UE 100 by the JP-CoMP before the handover procedure is performed, it is possible to omit a process of receiving the data that has not been transmitted to the UE 100 from the eNB 200-1. Therefore, it is possible to simplify a process that is performed during the handover procedure.

Other Embodiments

As described above, the present disclosure has been described with the embodiments. However, it should not be understood that those descriptions and drawings constituting a part of the present disclosure limit the present disclosure. From this disclosure, a variety of alternate embodiments, examples, and applicable techniques will become apparent to one skilled in the art.

For example, in the above-described first to third embodiments, the eNB 200-1 manages the cell 250-1 as a source cell and the eNB 200-2 manages the cell 250-1 as a target cell, however, the embodiment is not limited thereto. The eNB 200-1 may manage the cell 250-1 and the cell 250-2. That is, when a plurality of cells 250 managed by the same eNB 200 cooperate with one another to perform communication with the UE 100, the UE 100 may perform the handover from a cell to a cell managed by the same eNB 200.

Further, in each of the above-described embodiments, not only the cell 250-1 and the cell 250-2 but also another cell may perform the CoMP.

Further, In each of the above-described embodiments, the eNB 200-2 transmits the timing information and the power information together with the handover request negative acknowledgment, however, the embodiment is not limited thereto. The eNB 200-2 may not transmit the timing information and may not transmit the power information.

Further, in the modification of the above-described first embodiment, the eNB 200-2 may transmit information for transmitting a contention-based random access preamble signal instead of the information indicating the signal sequence for the Contention Free Access.

Further, in each of the above-described embodiments, the eNB 200-2 transmits the radio resource assignment indicating the radio resource for transmitting the connection complete notification to the cell 250-2 as the information of the random access preamble signal, however, the embodiment is not limited thereto. For example, the eNB 200-2 may notify the UE 100 of a request or an instruction for omitting the transmission of the random access preamble signal via the cell 250-1.

Further, in the modification of the above-described first embodiment, the UE 100 determines whether or not to omit the transmission of the random access preamble signal on the basis of the timing advance $TA_{A1}$ stored in step S201 and the latest timing advance $TA_{A2}$, however, the embodiment is not limited thereto. For example, in step S210, the UE 100 may determine whether or not to omit the transmission of the random access preamble signal on the basis of the timing advance $TA_A$ for adjusting the transmission timing to the cell 250-1 and a timing advance $TA_B''$ for adjusting the transmission timing to the cell 250-2.

Specifically, a description will be given on the assumption that the UE 100 receives the downlink signal not only from the cell 250-1 but also from the cell 250-2 by the CoMP in the uplink and the downlink.

In step S201 in the above-described modification, the UE 100 transmits, to the eNB 200-1, time information on reception time of a downlink signal from the cell 250-1 and reception time of a downlink signal from the cell 250-2 together with a measurement result.

In step S203, the eNB 200-1 transmits the time information from the UE 100 together with the handover request to the eNB 200-2.

In step S205, the eNB 200-1 transmits, to the eNB 200-1, the timing advance $TA_B''$ for adjusting the transmission timing to the cell 250-2 as timing information, together with the handover request acknowledgment.

Here, the eNB 200-2 calculates the timing advance $TA_B''$ on the basis of reception time of an uplink signal from the UE 100 and the time information received in step S203 in order to receive the uplink signal from the UE 100 by the CoMP.

In step S206, the eNB 200-1 transmits, to the UE 100, the received timing information together with the RRC connection reestablishment information.

In step S210, the UE 100 determines whether or not a difference between the notified timing advance $TA_B''$ and the timing advance $TA_A$ when receiving the RRC connection reestablishment information (that is, the current timing advance $TA_A$ for adjusting the transmission timing to the cell 250-1 before the handover) is equal to or less than a threshold value (see step S251). It is noted that, as shown in the above-described modification, the UE 100 may make a comparison by using the latest timing advance $TA_{A2}$ when the UE 100 has the latest timing advance $TA_{A2}$.

When the difference is equal to or less than the threshold value, the UE 100 performs a process of step S252, and when the difference ΔTA is larger than the threshold value, the UE 100 performs a process of step S253.

It is noted that, the threshold value here is a value of a range in which the eNB 200-1 and the eNB 200-2 are able to accept the shift of a reception timing of the same uplink signals from the UE 100.

In step S252, the UE 100 determines not to transmit the random access preamble signal, that is, the UE 100 determines to omit the transmission of the random access preamble signal, and performs a process of step S211 in FIG. 9. It is noted that, in step S212, the UE 100 adjusts the transmission timing to the cell 250-2 on the basis of the timing advance $TA_B''$ instead of calculation of the timing advance $TA_B$ (or $TA_B'$) in step S111. On the other hand, in step S253, the UE 100 transmits the random access preamble signal to the cell 250-2 similarly to the above-described normal handover procedure.

As described above, the eNB 200-2 may transmit the timing advance TAB" for adjusting the transmission timing to the cell 250-2 as timing information. Further, the UE 100 (the controller) may omit the transmission of the random access preamble signal in a case where the difference between the timing advance $TA_A$ when the RRC connection reestablishment information is received and the timing advance $TA_B''$ notified from the cell 250-2 is equal to or less than the threshold value. Accordingly, when the difference of the timing advance is small, the shift of a timing of transmitting an uplink signal is small, and thus the UE 100 is able to omit the transmission of the random access preamble signal. Further, when determining that the shift of the timing of transmitting the uplink signal is large, the UE 100 is able to transmit the random access preamble signal.

In addition, in the above-described embodiments, the LTE system as one example of a cellular system is described; however, the present disclosure is not limited to the LTE system, and the present disclosure may be applied to a communication system other than the LTE system.

INDUSTRIAL APPLICABILITY

As described above, the user terminal and the base station according to the present disclosure prevent occurrence of interference based on transmission of a random access preamble signal by a user terminal, and thus they are useful in the mobile communication field.

The invention claimed is:
1. A communication system, comprising:
a first base station configured to control a first cell;
a second base station configured to control a second cell; and
a user terminal configured to determine whether or not to omit a transmission of a random access preamble signal in a handover procedure from the first cell to the second cell when the user terminal transmits a notification indicating that a connection with the second cell is completed, wherein
the first base station transmits, to the second base station, a handover request of the user terminal in response to a decision of a handover to the second cell,
the second base station notifies the user terminal of information via the first base station in response to admitting the handover request, wherein the information indicates first information for adjusting a transmission timing of the notification and second information on a radio resource for transmitting the notification to the second base station,
the user terminal determines that the user terminal omits the transmission of the random access preamble signal, on a basis of the first information, and
the user terminal transmits the notification to the second base station by use of the second information in response to the determination.
2. A user terminal, comprising:
a processor configured to perform a process of determining whether or not to omit a transmission of a random access preamble signal in a handover procedure from a first cell controlled by a first base station to a second cell controlled by a second base station when the user terminal transmits a notification indicating that a connection with the second cell is completed; and a memory communicatively coupled to the processor, wherein the processor performs processes of:

receiving, from the second base station, information via the first base station, wherein the information indicates first information for adjusting a transmission timing of the notification and second information on a radio resource for transmitting the notification to the second base station;

connecting with the second cell;

determining that the user terminal omits the transmission of the random access preamble signal, on a basis of the first information; and transmitting the notification to the second base station by use of the second information in response to the determination.

3. A processor for controlling a user terminal, the processor communicatively coupled to a memory and configured to perform a process of determining whether or not to omit a transmission of a random access preamble signal in a handover procedure from a first cell controlled by a first base station to a second cell controlled by a second base station when the user terminal transmits a notification indicating that a connection with the second cell is completed, wherein the processor performs processes of:

receiving, from the second base station, information via the first base station, wherein the information indicates first information for adjusting a transmission timing of the notification and second information on a radio resource for transmitting the notification to the second base station;

connecting with the second cell;

determining that the user terminal omits the transmission of the random access preamble signal, on a basis of the first information; and transmitting the notification to the second base station by use of the second information in response to the determination.

* * * * *